(12) United States Patent
Bush (10) Patent No.: US 7,520,513 B1
(45) Date of Patent: Apr. 21, 2009

(54) ULTRA PORTABLE WHEELED VALET

(76) Inventor: Jerry D. Bush, 345 Wildwood Lake Ct., Suwanee, GA (US) 30024

( * ) Notice: Subject to any disclaimer, the term of this patent is extended or adjusted under 35 U.S.C. 154(b) by 0 days.

(21) Appl. No.: 11/824,666

(22) Filed: Jul. 2, 2007

Related U.S. Application Data (60) Provisional application No. 60/818,409, filed on Jul. 3, 2006.

(51) Int. Cl.
*B62B 1/04* (2006.01)
(52) U.S. Cl. .................... 280/35; 280/47.18
(58) Field of Classification Search ............ 280/47.131, 280/47.17, 47.18, 47.19, 79.3, 35, 639, 37
See application file for complete search history.

(56) References Cited

U.S. PATENT DOCUMENTS

| | | | |
|---|---|---|---|
| 2,639,162 A * | 5/1953 | Schon ................. | 280/42 |
| 5,242,189 A * | 9/1993 | Osaki .................. | 280/645 |
| 5,678,842 A * | 10/1997 | Hook et al. ........... | 280/646 |
| 5,685,552 A * | 11/1997 | Osaki .................. | 280/47.24 |
| 6,394,471 B1 * | 5/2002 | Watson ................ | 280/47.19 |
| 6,929,269 B2 * | 8/2005 | Oliver ................. | 280/47.18 |
| 7,188,859 B2 * | 3/2007 | Hardin et al. ......... | 280/652 |
| 7,258,352 B2 * | 8/2007 | Odgers ................ | 280/47.28 |
| 2003/0218307 A1 * | 11/2003 | Anderson et al. ...... | 280/79.2 |
| 2004/0080143 A1 | 4/2004 | Johnson | |
| 2005/0156406 A1 | 7/2005 | Prather | |
| 2007/0273115 A1 * | 11/2007 | Anthony ............... | 280/47.19 |

OTHER PUBLICATIONS

Webpage Hot Pink Lips Wheel Tote Shopping Luggage Bag from www.ecrater.com/product.php?pid-311427 dated Aug. 14, 2006.
Webpage Folding Shopping Bag With Wheels from ww.cwimedical.com/folding-shopping-bag.html dated Aug. 9, 2006.
Webpage Rolling Beach Cart from http://www.lillianvernon.com/catalog/product_display.jsp?searchParam=LV&pdld=556&addOn=785&sid=eas dated Jul. 30, 2007 Lillian Vernon.

(Continued)

*Primary Examiner*—Christopher P Ellis
*Assistant Examiner*—John D Walters
(74) *Attorney, Agent, or Firm*—Michael A. Mann; Nexsen Pruet, LLC (57) ABSTRACT

The invention is an ultra portable wheeled valet, hereafter referred to as the Shopping Diva, which is a very light weight, free standing, expandable/collapsible, portable, dolly tug, specifically designed as a shopping aide to securely hold multiple packages of various sizes and weight. The Diva is designed to be tugged (pulled from behind) when in use. As a portable dolly tug, the invention will collapse and fold up into a very small, manageable unit not much larger than an umbrella taking very little space in a vehicle. Likewise, as a portable dolly tug for shopping, it is very easy to expand, set up, and collapse again for storage, and very stable due to the wide stance of the rubber wheels. It is pulled via a simple curved handle only requiring one hand, either right or left, to pull the Diva while walking and shopping.

11 Claims, 4 Drawing Sheets

OTHER PUBLICATIONS

Webpage 1112 Mall Shopper, prod-1112-0306 from smartecarte.com—2006 Smarte Carte, Inc.

Webpage Go-Cart Folding Crates from http://www.completek-12.com/productcart/pc/viewCat_h.asp?idCategory=118118 dated Jul. 30, 2007 Copyright 2007 Complete Business Systems.

Webpage Eight-Shopping-Bag Caddie from http://www.shop.com/Eight_Shopping_Bag_Caddie-4614399-p.shtml dated Jul. 20, 2007.

Photograph "Picture Taken in Paris" of Shopping Cart in Use.

* cited by examiner

ULTRA PORTABLE WHEELED VALET

This application claims priority to U.S. Provisional Patent application Ser. No. 60/818,409 filed Jul. 3, 2006, which is incorporated in its entirety herein.

BACKGROUND OF THE INVENTION

Shopping malls have become a familiar part of the American landscape over the past 30 years. In times past, standalone shops set side-by-side on urban streets were more typical. As cities grew and Americans moved to the suburbs, major malls sprang up to serve the shopper. Super malls in major cities now have hundreds of stores which the consumer can visit in one trip. Centralizing many retailers under one roof created a welcoming, climate controlled environment for the shopper to linger and comfortably spend more time and therefore mare money in a variety of different stores.

The centralized, compact nature of the mall solved the problem of having to run back and forth between stores in and out the elements. The mall solution however created another problem. Parking at the mall is remote to all but the stores on its perimeter. A trip to the mall can easily result in several miles of walking, beginning with the trip from the car and the inevitable return to the automobile which may be parked hundreds of meters from the entrance. During the holiday shopping season this becomes more of an issue. The malls and their parking lots are even more crowded as the shopper spends more time buying from even more stores in a single trip.

The fun of shopping quickly becomes an endurance contest as one bag is added to another; two becomes three, becomes more. The weight increases and the strain of the bag handle on the fingers and arms increases. Many retailers have turned to the less expensive plastic bags where the handles stretch and cut into the hand from the weight, causing the handle to collapse and cut off the circulation. In addition, depending on the height of an individual, the need exists to lift the bags and hold the collection at a distance which will keep them from dragging the floor. In a very short time, the combined purchases become very heavy and increasingly cumbersome.

SUMMARY OF THE INVENTION

The invention is designed primarily to be a fashionable transport for a number of shopping bags and light packages during an extended shopping spree. The portable wheeled valet can be used in either the open or closed states. When the device is opened, packages will be cascaded creating additional capacity, stability and added security. The design cleverly leverages the laws of physics to create stability and security for the cargo during transport- and rest, because of its specific application design. The design will also serve to keep the cargo contents much dryer in the event of inclement weather between the mall and the car than previous designs. The design will keep the contents more secure from possible theft of its contents than prior art. Central to its benefits is its compact size for storage. When it is collapsed it occupies less space than a typical golf umbrella, fitting comfortably into a car trunk or back seat between uses. Design variations will emphasize cosmetic differences. There will be heavy duty verses light duty variations.

DETAILED DESCRIPTION OF THE INVENTION

The present invention is a personal, portable, hand operated device which is exceptionally lightweight and compact, providing the operator with an unusually strong mechanism for carrying bags or packages of reasonable size and weight while shopping. This mobile valet or portable wheeled valet will incorporate one or more wheels 3 (preferably two wheels) and at least one adjustable handle with which to push or pull the device. The handle serves a dual purpose. When shifted upright it will extend a leg which will allow the device to stand in a diagonal position without assistance and remain stable no matter how package weight is distributed. The operator can park the invention in an at-rest position until said operator is ready to proceed. This is a significant improvement over the hand truck type designs which cannot stand in any position other than vertical resulting in poor stability at best. In a vertical position, there is a higher probability of packages falling off their uneven stack. A special flexible limited stretch material surrounding the frame serves as a backplane to support and hold the packages, either via a multiple 'Hook Loop', center rack with the capacity for several (typically 18 or more) packages (bags) or other common constraint methods such as ties or bungee style 'knob and hoop' methods. Likewise, the same system can have a containment enclosure that is zipper-adjustable to hold the cargo packages in a more secure method to reduce the chance of theft. When collapsed it will role up compactly around the frame for storage in a cars trunk or backseat.

Compared to prior art, the design is a leap forward in a number of respects: chiefly its strength, portability, compact size for storage, and carrying capacity; the unique way it holds and stacks a multitude of bags and boxes; and its place with its owner as a fashion accessory. Style and fashion elements along with its name are emphasized in the packaging. All elements in the design are considered critical in its appeal to the buyer. Prior art carts were designed specifically to carry packages but are large and heavy. They are somewhat portable but only to the extent that they are mobile, typical of a shopping cart one finds at a grocery store but smaller and with the same limitations, Also, items are easily lifted (stolen) out of them by passers by. Other wheeled carts are designed primarily to carry luggage between the baggage claim area of an airport and a remote parking lot. Here again, their only position is vertical which does not lend itself to easy, stable package and bag holding. This design also primarily depends on gravity and the structure and stability of the package to hold itself vertical without falling off. This is most difficult if the bags are plastic and full of oddly shaped products. Prior art considered truly portable is a portable hand truck built of metal tubing, two wheels and a telescoping handle. This device was designed specifically to carry boxes as heavy as 50 lbs in an office environment. Yet another on the market is a collapsible box on wheels with a telescoping handle designed primarily to carry file folders in a hanging position, essentially making it a rolling file cabinet to take between home and office, Still another has two wheels and flapped compartments made of a decorative ballistic nylon of comparable fabric or vinyl. In theory a shopper could transport a shopping bag in this device but it is designed primarily to transport things like towels, suntan lotions, and other outing paraphernalia between the car and the beach or picnic spot. It offers a centralized place where belongings can be contained in one place on wheels to prevent loss and add convenience As we have described for shopping these kinds of products are not practical solutions for two reasons. One, they can carry very few packages. The space available for a bag is very limited. In fact, so few bags could logically be carried on this device that there would be no practical reason to use the product for a shopping application at all. Secondly, while the device is mobile, it is not truly portable in the sense that it is not designed to be collapsed in a small space. This is a very important consideration for this application. The invention will take precious little space in a car trunk or rear seat. There is no application specific product on the market today that meets all the aforementioned needs. Therefore there is a need in the market place for a portable package carrying system specifically designed for today's shopper with application specific designs to enhance the shopping experience by adding convenience, flexibility, fashion sense, weather protection and package theft security in a light weight, easy to carry (one hand; over shoulder; under arm) inexpensive package.

Figure 1:
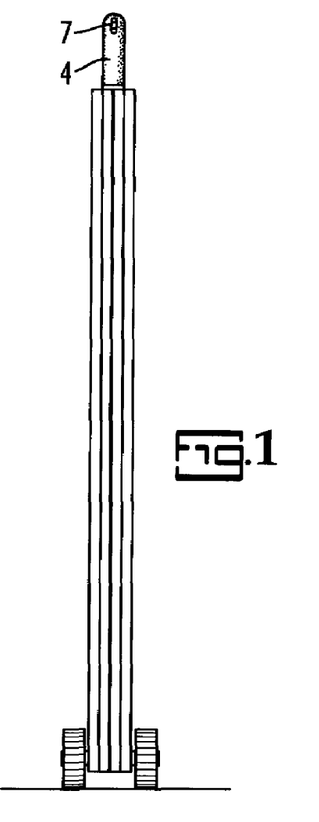
FIG. 1 is a front view of the invention in a folded position, showing the frame only.

The portable valet can be made in any size and should preferably be of a size suitable for the intended user. Actual production units may vary in size as different models, specific to function, form and price positions evolve. 1) The portable dolly tug or portable wheeled valet (herein also called Diva) in its collapsed, storable state (See FIG. 1). The expanded format is preferably of a size that allows the Diva to easily pass through obstructions, such as the "baby carriage blocking post" found at the base of many escalators throughout malls all over the world, which purposely prevent people from putting baby carriages on escalators, forcing them to use elevators.

The handle 4 is of any suitable design and preferably curved approximately 120 degrees (similar to an umbrella handle). The hinged handle at the top of the center frame locks in two positions. This handle also has a 'Rest/Support Rod' 5 (See FIG. 2) attached that runs parallel and under the length of the center frame to provide additional support strength to the frame while pulling a fully loaded tug. When repositioned by a downward twist of the handle, it becomes a support shaft to hold the Diva in its free standing position of approximately 60 degrees. This handle has two positions: 2.1) Tug and storage position where handle is locked in a position that is horizontally aligned with the center Diva frame and the Rest/support shaft is locked against the center frame. This design keeps the Diva handle in the optimum position for pulling without undue stress to the hand and wrist.

Figure 2:
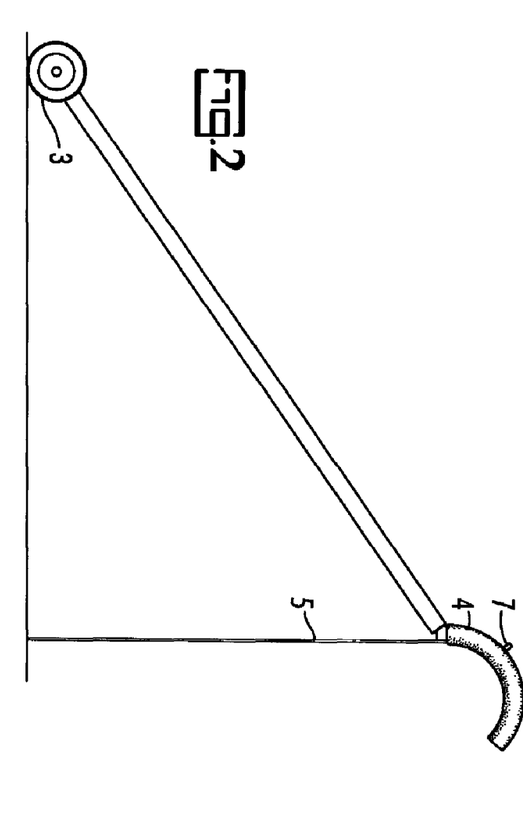
FIG. 2 shows a side view of the invention in a rest position.
Figure 3:
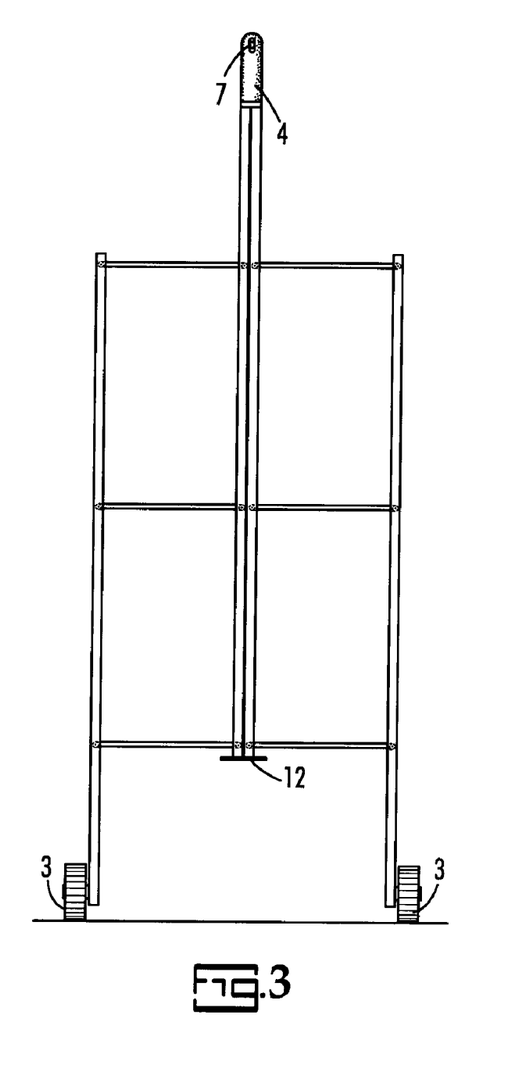
FIG. 3 is a front view of the invention 50% open in an open and upright position, showing the frame only.
Figure 4:
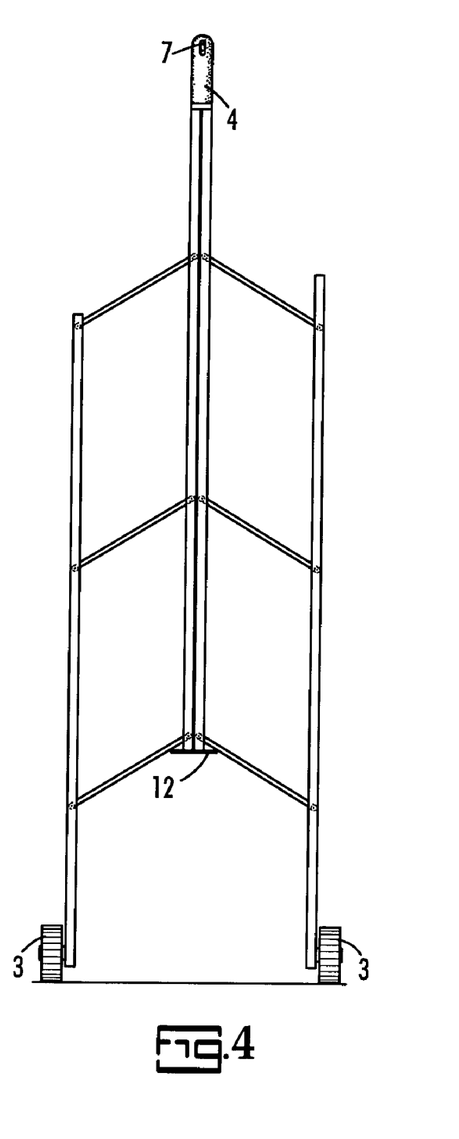
FIG. 4 shows an open and locked front view of the invention, frame only.
Figure 5:
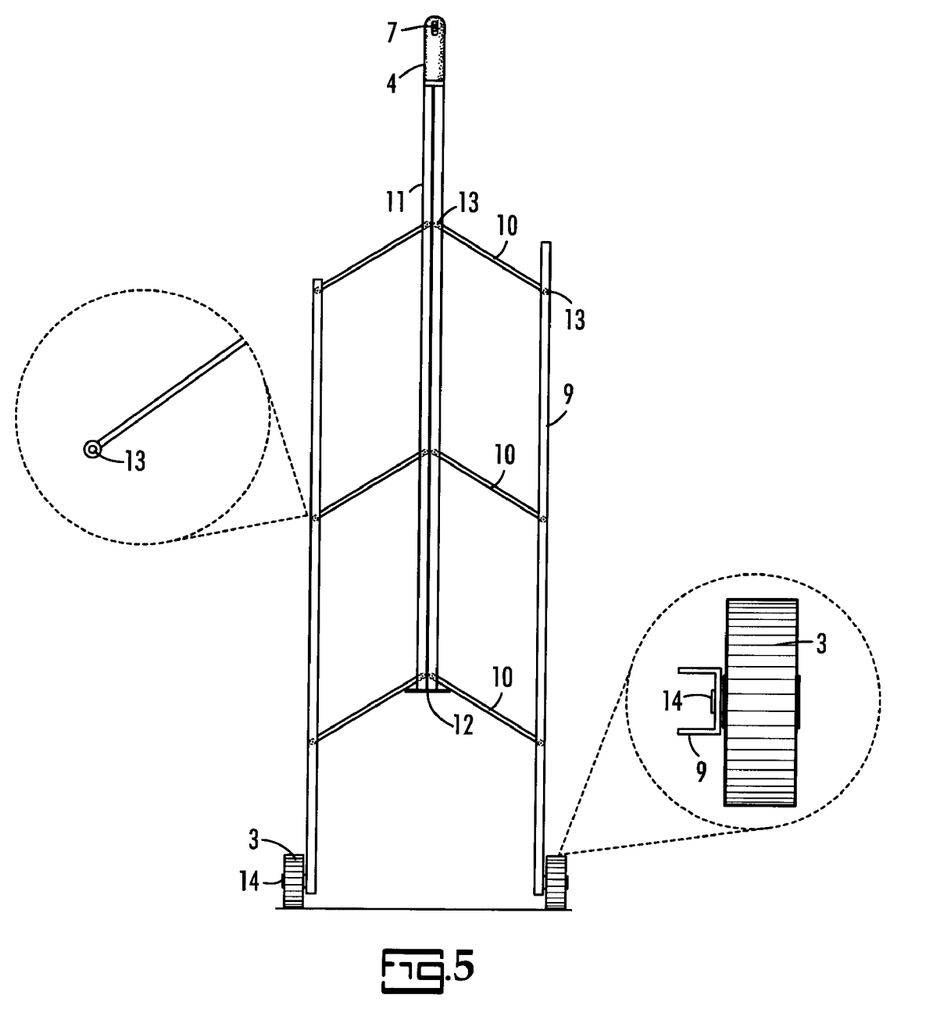
FIG. 5 shows a front view showing the parts of the invention.
Figures 6, 7:
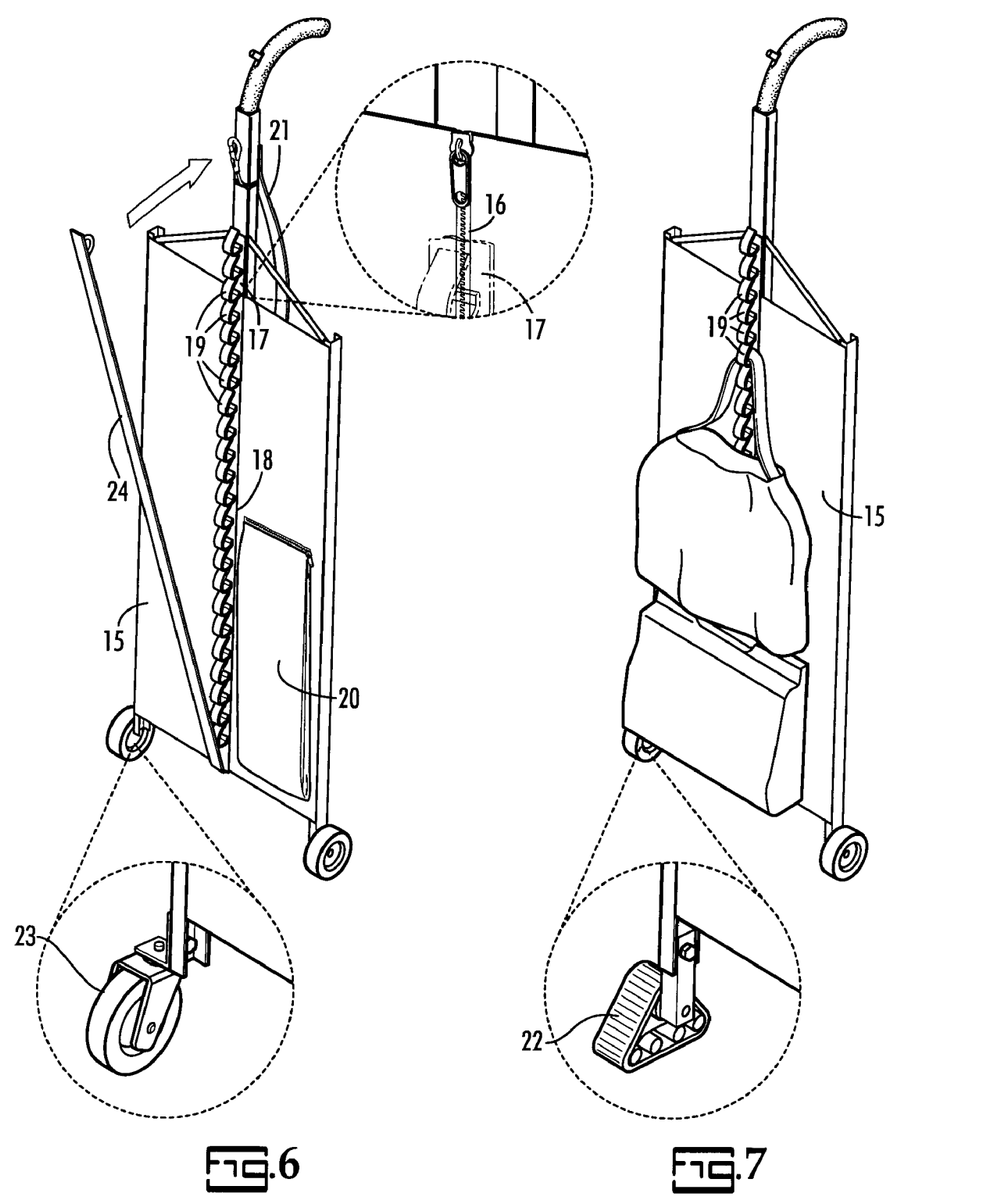
FIG. 6 shows the wheeled valet in an open position, with a cover and loops to hold bag handles.
FIG. 7 shows merchandise bags attached to a portable wheel valet.

2.2) Rest and free standing position where the handle release button 7 pushed by the thumb, releasing the handle lock and allowing the handle to turn upward where it is hinged to the Diva center frame, still horizontal to the frame locking in this new upward position which releases and lowers downward the metal rest/support shaft 5 from under the center frame attached to the handle just below the hinge point. The handle locks in this position to stabilize the Diva in the at rest position. Applying pressure to the release button on the handle will unlock the handle from it's rest position and by applying a slight twisting motion (like lifting an umbrella or walking cane to push something with its tip), the rest/support rod returns to its support position and the handle locks in it's tug position once more.

3) The Diva frame is constructed of a suitable center frame for structural support, for example four (4), extruded open square channel beams (U shaped) 11 for strength, made, for example, of aluminum magnesium alloy, and transverse supports and outer frame positioners, for example six (6) 'Dog Bone' shaped extruded aluminum magnesium alloy ribs 10 that act as transverse supports and outer frame positioners between the center frame and the outer frame. The outer frame also provides structural support and can, for example, be formed from two (2), back-to-back channel beams, spot welded together to form an extremely strong "I" beam 9. The bottom of the "I" beam that forms the center has a flat metal plate 12 that is welded to the channel beams to add additional strength. This metal plate also acts as a travel limiter, which limits how far the frame ribs can travel, thus controlling the open width of the expanded Diva. The outer edge frame is comprised of the other two extruded, aluminum magnesium alloy, open square channel beams. The open side of these beams, face the open sides of the center support frame beams. The outer frame channel beams (the vertical beams running parallel directly left and right of the center channel beams) connect to the center support frame via the "dog bone" transverse support rib beams (typically six in number). These beams typically have rounded ends, a half inch in diameter and a little over a half inch in width and an eighth inch thick, and approximately 7 inches long. The rounded ends have an eighth inch hole in their center running the width of the rib. These holes act as the load-bearing surface for the mounting pins that attach the ribs to the center frame and to the outer frame pieces. These ribs force the outer frames to move parallel to the center frame and position the outer frames either in the collapsed position or the expanded position and help maintain registration alignment of all frame beams. The axle pins that hold the rib beams in position are made of brass or bronze to act as a bearing surface. These pins pass through equally spaced holes in the channel beams 13, through the bearing holes in the rib beams and back out of the channel beams. The fitted pin ends are stamp formed into rounded caps on the outer surface of the channel beams preventing the pins from coming out and allowing the pins to also act as strengthening supports to the channel beam sidewalls, keeping them from opening when the Diva is under load thus integrating the center support to the outer supports for distributing the load evenly across a larger cross sectional area, passing the bulk of the weight to the rubber wheels and to keep the handle end all the lighter. Alternate materials of construction and methods of construction can also be employed.

4) The wheels 3 (preferably rubber) are typically approximately 3 inches in diameter and 1 inch wide, although other sizes can also be used. They have a metal center bearing surface transverse the width of the wheel. These wheels mount to an axle shaft (e.g., ⅜ inch in diameter), typically metal, 14, that has been welded or sweat fitted approximately ¼ inch from the bottom end of the outer frames. The wheel bearings and axles are then held on the axles via chrome plated metal cap locks and can be permanently lubricated with graphite for ease of maintenance.

The wheels can also be 'swivel trucks' 23 similar to office chair types which roll easily and permit sideways movement in close areas and crowds of people when rolling the Diva between clothes racks or other tight places. The mounting bearings will mount to the bottoms of the two outer support beams, in their open area; this will also strengthen the 'U' termination. This one modification will make the expanded Diva a little narrower by about 1.5 inches, making it even easier to pull between 'baby carriage blocking post' at escalators and—it further reduces the footprint for stowage.

5) The Diva frame is covered with a covering material, 15, typically canvas/nylon material that is attached to the outer frame beams. The canvas/nylon is folded over the outer edge and onto the bottom surface of the channel beams and riveted via typically 14 (7 per beam) large pan faced rivets. The larger cross sectional surface area of these rivets holds the material better and prevents it from ripping at their attachment points. Having the material pulled around the top and outer edges distribute the weight load on the material evenly along the entire outer channel beam surface. The center of this canvas/nylon foundation surface has a heavy duty zipper (e.g., nylon) 16 running its length from top to bottom. It connects to the center support beam via a snap or hook'n hole about four inches down from the handle and acts to close the covering material.

The purpose of this design is to take the overall working weight of the packages and transfer it to the strongest member of the Diva, which is the center beam, and transfer this load down to the wheels instead of across the surface of the canvas/nylon surface. Importantly, this surface balances and steadies the packages laying on it, but the bulk of the weight load transfers to the center beam via the woven nylon strap (belt material).

A zipper flap 17 is sewn to the canvas/nylon top, to the left side to the zipper (looking at the Diva from the front, covering the zipper like a pant zipper cover). The top of this nylon strap is about 2 inches longer than the canvas/nylon surface, so it will extend upward towards the snap receiver or hook n' hole. Once fastened to the center beam, the entire canvas/nylon surface is strengthened greatly and in fact strengthens the entire integrated system. The downward stress placed on the upper surface from the packages, (as a frictional load) is divided by three; i.e. both outside support beams and the center via a nylon strap 18 that holds the packages and transfers most of their weight ultimately to the wheels and also to the free standing rod when deployed. The strap has to be fastened to the center beam each time to prevent the canvas/nylon surface from moving downward as the Diva is opened and expanded, and the strap has to be unfastened before the Diva can be collapsed and stowed. This is the frame and surface integration lock. When the frame is either, expanded or collapsed during operation, the width of the Diva at the halfway point is wider than the final operational width. When the zipper is unzipped, the material beneath is of sufficient width while expansion or collapsing is taking place. Once the limiter stops the rib beam movement, then the zipper is pulled up into place tightening the surface canvas/nylon material, locking the channel beams into place making the surface taut to hold the load of the packages, which are placed on it. This zipping action reduces the fabric surface area tightening the upper load bearing, surface and unifies all moving parts into one rigid integrated system that is stronger than the sum of the individual parts. This canvas/nylon outer surface can have numerous options that will effect the price position and unique utility of each model of Diva.

A basic model would have a series of hook and loop fasteners (e.g. VELCRO™ loops) 19 (12 for example on 3 inch spacing) attached to a single nylon 1 inch wide, woven strap that is sewn onto the canvas/nylon surface off center to the side of the zipper and acts as a flap and load transfer strap, running parallel above the center frame beam, over the zipper when laying flat much like a zipper cover on a pair of pants. In more expensive models, a zip on outer canvas/nylon piece is added to form a large, long pocket (not shown in figures) where the bags and packages can be placed inside for additional security. Multiple zippers or snaps will expand or tighten this outer layer by folding back under the zipper or snaps, 3 to 4 inches of material by creasing it. This option is one solid, waterproof piece, so the packages in it can stay dry while going back to the car, van or SUV on rainy days 5) The operation of a typical Diva is as follows: The basic model with only the VELCRO™ hook straps would fold up and the canvas/nylon surface wrapped around the collapsed framework and be held in position via VELCRO™. The owner pulls the VELCRO™ loose and unfolds the canvas/nylon surface. Next, she pushes down on one of the outer frame beams at the handle end and it expands and hits the limiter and stops. She does the same thing to the other side, and then pulls the zipper up to the top, tightening the canvas/nylon surface, locking the entire system into a rigid tug dolly and proceeds into the mall.

This is such a simple and lightweight system that the collapsed unit can be easily pulled or carried on the shoulder via an integrated strap (not shown in figures) until the first purchases are made at which time the Diva is expanded, which requires only about 20 seconds and ready for service.

The bags, in which the retail stores put the merchandise, attach to the Diva via the nylon strap loops, which pass through the bags hand holes helping to secure the contents in the bag. Primarily, the bags hold the merchandise and the Diva holds the bags. As more bags are added, cascaded from the bottom up, they are laid on top of each other as the higher, empty VELCRO™ loops are used up sequentially. This over stacking or cascading adds additional security to the merchandise, as lower bags are more difficult to get into due to bags, which are lying over their tops. Further to this point, more and more retailers are beginning to staple the top of the bags closed. The VELCRO™ used will be the heavy duty aircraft style that takes a very deliberate effort to undo, so no one will easily snatch a bag from the Diva. If the optional outer, expandable cover is added, then all bags are placed into this very secure holding pocket and if additional security is needed, then the (now internal) VELCRO™ straps can still be used.

There are additional variations of the product. One such option is a set of track trucks (not shown in figures) instead of wheels. These, triangular shaped plastic cores have a metal bearing off top center that fits on the Diva axles just like the wheels and use the same cap lock system. A moving, continuous, rubber track runs the circumference of the plastic core, in a guide track groove. The track is widest at the bottom and covers 4 to 5 inches. The track trucks rock back and forth on the axle for completely free movement. The advantage of the track is that the owner can easily pull the Diva up stairs, up and over curbs, and over rough terrene such as stone walks and any other uneven surfaces, important to city dwellers who will pull the Diva over uneven sidewalks. The track trucks will easily out last the wheels as they can distribute more of the load across a much larger cross sectional surface area. Also the wider, longer surface area of the track trucks allow for a much smoother ride for the packages as the tracks will pass over small indention's, uneven surfaces, cracks and holes that a wheel may go down into. This is especially true of the guard ramps of escalators and the open clearance gaps at elevator doors and rapid transit doors. This feature will be most important for units sold in major cities like New York or Paris where the uneven sidewalks can be unforgiving to a standard wheel set.

Another addition is a bag rod lock 24 that attaches to the bottom of the Diva canvas/nylon surface and locks closed at the top. When adding a new bag the lock is released and the rod moves outward and the bags hand-hold is slid over the rod and down to the other packages and locked again for added security. The add-on to the basic model, and the container model, prevents anyone from easily removing a package from the Diva, an important security feature for the city dweller. Box straps can be added which will allow the Diva to carry moderate size boxes (e.g., of up to 18 inches long and 24 inches high and 10 inches deep).

The preferred type of lock works via the "Metal Plate/Travel Limiter." The two bottom support ribs come to rest against this plate which limits their movement downward. At this position they are beyond the apex of their width extension at mid (50%) point and at this point they are narrower. The zipper channel in the middle of the cover has a surplus loop of material under it which acts as a "Wear Buffer" between the center frame and the cover. When the zipper is open the loop expands the width of the cover so it can make the apex (50%) position and allow the frame to continue downwards to the lock position. Once the ribs rest on the plate, the zipper is zipped up again reducing the width of the cover and tightening the surface tension to restrict the movement of the ribs holding them tightly against the plate. Using a canvas/nylon material allows a very small amount of horizontal stretch, and this little bit of stretch acts as a shock absorber while wheeling the Diva around on uneven and ruff surfaces, by allowing the wheels to move up and down and in and out slightly as ruff surfaces are encountered, translating some of the vertical force transmitted upwards to be redirected horizontally reducing impact on the good being carried. This action is directly proportional to the weight carried, maximizing safe travel for delicate goods.

Also, the outer canvas/nylon cover that zips on, to form the storage compartment on the Diva, can be given away as a promotional advertising device by having the company Logo printed onto the outside.

Returning the Diva back to storage is equally simple too. The bags are removed from the Diva and placed into the back seat or trunk of the car. All VELCRO™ straps are secured and the zipper is pulled all the way down expanding the canvas/nylon surface. The handle is pushed down collapsing the wheels and raising the two outer support beams and then they are pulled all the way up to the handle, collapsing the entire Diva, at which point the canvas/nylon surface is wrapped around the Diva core (like wrapping up an umbrella) and the VELCRO™ fasteners are connected holding the unit tightly together for storage.

The invention also relates to a method for carrying packages comprising attaching said packages to the portable wheeled valet described herein.

Furthermore, the invention relates to, but is not limited to, the specific design of the portable wheeled valet described herein.

The following examples are intended to illustrate and not limit the invention.

EXAMPLE 1

A Portable Wheeled Valet

1) The portable dolly tug (herein called Diva) in its collapsed, storable state, is approximately 41.5" in length including the handle; 2.25" wide for 38.5 inches and 4.25" wide for the remaining 3" where the rubber wheels are located, and approximately 1" thick for 38.5 inches and 3" where the rubber wheels are located. In the expanded state, it is approximately 53.5" in length including the handle; 16" wide for 38.5 inches and 18" wide for the remaining 3" where the rubber wheels are located; approximately 1" thick for 38.5 inches and 3" where the rubber wheels are located. The limit to 18" expanded, allows the Diva to easily pass through the "baby carriage blocking post" found at the base of many escalators throughout malls all over the world, which prevent people from putting baby carriages on escalators, forcing them to use elevators.

2) The handle is approximately 1" in diameter and curved approximately 120 degrees (similar to an umbrella handle). The hinged handle at the top of the center frame locks in two positions. This handle also has a 'Rest/Support Rod' attached that runs parallel and under the length of the center frame to provide additional support strength to the frame while pulling a fully loaded tug. When repositioned by a downward twist of the handle, it becomes a support shaft to hold the Diva in it's free standing position of approximately 60 degrees. This handle has two positions: 2.1) Tug and storage position where handle is locked in a position that is horizontally aligned with the center Diva frame and the Rest/support shaft is locked against the center frame. This design keeps the Diva handle in the optimum position for pulling without undue stress to the hand and wrist.

2.2) Rest and free standing position where the handle release button pushed by the thumb, releasing the handle lock and allowing the handle to turn upward where it is hinged to the Diva center frame, still horizontal to the frame locking in this new upward position which releases and lowers downward the metal rest/support shaft from under the center frame attached to the handle just below the hinge point. The handle locks in this position to stabilize the Diva in the at rest position. Applying pressure to the release button on the handle will unlock the handle from it's rest position and by applying a slight twisting motion (like lifting an umbrella or walking cane to push something with its tip), the rest/support rod returns to its support position and the handle locks in it's tug position once more.

3) The Diva frame is constructed of four (4), extruded, aluminum magnesium alloy, open square channel beams (U shaped) for strength, and six (6) 'Dog Bone' shaped extruded aluminum magnesium alloy ribs that act as transverse supports and outer frame positioners between the center frame and the outer frame. The center frame is formed from two (2), back-to-back channel beams, spot welded together to form an extremely strong "I" beam. The bottom of the "I" beam that forms the center has a flat metal plate that is welded to the channel beams to add additional strength to the open channel sides as this is the end that has the wheel support ribs extending from it to help control, balance and distribute the weight of the loaded tug to the wheels. This metal plate also acts as a travel limiter, which limits how far the frame ribs can travel, thus controlling the open width of the expanded Diva. The outer edge frame is comprised of the other two extruded, aluminum magnesium alloy, open square channel beams. The open side of these beams, face the open sides of the center support frame beams. The outer channel beams connect to the center support frame via the six (6) 'dog bone' transverse support rib beams. These beams have rounded ends, a half inch in diameter and a little over a half inch in width and an eighth inch thick, and approximately 7 inches long. The rounded ends have an eighth inch hole in their center running the width of the rib. These holes act as the load-bearing surface for the mounting pins that attach the ribs to the center frame and to the outer frame pieces. These ribs force the outer frames to move parallel to the center frame and position the outer frames either in the collapsed position or the expanded position and help maintain registration alignment of all frame beams. The axle pins that hold the rib beams in position are made of brass or bronze to act as a bearing surface. These pins pass through equally spaced holes in the channel beams, through the bearing holes in the rib beams and back out of the channel beams. The fitted pin ends are stamp formed into rounded caps on the outer surface of the channel beams preventing the pins from coming out and allowing the pins to also act as strengthening supports to the channel beam sidewalls, keeping them from opening when the Diva is under load thus integrating the center support to the outer supports for distributing the load evenly across a larger cross sectional area, passing the bulk of the weight to the rubber wheels and to keep the handle end all the lighter.

4) The rubber wheels are approximately 3 inches in diameter and 1 inch wide. They have a metal center bearing surface transverse the width of the wheel. These wheels mount to a ⅜ inch metal axle shaft that has been welded or sweat fitted approximately ¼ inch from the bottom end of the outer frames. Permanently lubricated with graphite, the wheel bearings and axles are then held on the axles via chrome plated metal cap locks.

The wheels can also be 'swivel trucks' similar to office chair types which roll easily and permit sideways movement in close areas and crowds of people when rolling the Diva between clothes racks or other tight places. The mounting bearings will mount to the bottoms of the two outer support beams, in their open area; this will also strengthen the 'U' termination. This one modification will make the expanded Diva a little narrower by about 1.5 inches, making it even easier to pull between 'baby carriage blocking post' at escalators and—it further reduces the footprint for stowage.

5) The Diva frame is covered with a canvas/nylon material that is attached to the outer frame beams. The canvas/nylon is folded over the outer edge and onto the bottom surface of the channel beams and riveted via 14 (7 per beam) large pan faced rivets. The larger cross sectional surface area of these rivets holds the material better and prevents it from ripping at their attachment points. Having the material pulled around the top and outer edges distribute the weight load on the material evenly along the entire outer channel beam surface. The center of this canvas/nylon foundation surface has a heavy duty nylon zipper running its length from top to bottom. It connects to the center support beam via a snap or hook'n hole about four inches down from the handle.

EXAMPLE 2

Use of the Portable Wheeled Valet

The portable wheeled valet is rolled in its collapsed state by the user from the parking lot of a shopping center to the store where the first purchase is planned. It is then expanded and the bag holding the first purchase is attached via one nylon strap loop, and the shopper moves to the second store. After the shopping trip is completed, the shopper rolls the purchases back to the parking lot, unloads the purchases, collapses the rolling valet and leaves.

Those with expertise in this area will recognize that variations of the portable wheeled valet beyond those disclosed above, are incorporated within the invention.

I claim:

1. A portable wheeled valet capable of being collapsed for storage and expanded when in use for holding one or many packages, said portable wheeled valet comprising a stationary, single-piece center member frame having a handle attached to one end thereof, outer frame beams attached to said center frame, an axel shaft attached to the second end of said outer frame, one or more swivel truck wheels attached to said axel shaft, and a covering material attached to said outer frame beams with a zipper of sufficient length to run top to bottom of said covering, wherein said covering material is made taut via closing said zipper that pulls said covering material tightly around said outer frame.

2. The portable wheeled valet capable of being collapsed for storage and expanded when in use for holding one or many packages, said portable wheeled valet comprising a stationary, single-piece center member frame having a handle attached to one end thereof, outer frame beams attached to said center frame, an axel shaft attached to the second end of said outer frame, one or more swivel truck wheels attached to said axel shaft, and a covering material attached to said outer frame beams with a zipper of sufficient length to run top to bottom of said covering,
   wherein said covering material is pulled tightly over said outer frame beams, and said covering material acts as a backplane to distribute the weight of said packages attached to said center frame.

3. The portable wheeled valet of claim 2 wherein
   a. said center frame, outer frame beams, and axel shaft are made of metal,
   b. said wheels are made of rubber, and
   c. said covering material is made of canvas or nylon.

4. The portable wheeled valet of claim 3 further comprising one or more components selected from the group consisting of a zipper flap, a shoulder strap, hook and loop fasteners, pockets, track trucks, and a bag rod lock.

5. A method of carrying packages comprising attaching said packages to the portable wheeled valet of claim 2.

6. The portable wheeled valet of claim 2 comprising a single unit constructed of an interlocking mechanism relying on an integration between said frame, said zipper, and said covering material to form a tight surface on which said packages are attached.

7. The portable wheeled valet of claim 6 wherein said covering material comprises canvas, nylon, or a similar material.

8. The portable wheeled valet of claim 2 which is capable of being carried in one hand.

9. The portable wheeled valet of claim 2 wherein said covering material and flex of components of said frame act as a shock absorber.

10. The portable wheeled valet of claim 2 further comprising a built in bag rod lock that attaches to the bottom of said cloth surface and locks closed at the top, serving as a security device.

11. The portable wheeled valet of claim 2 further comprising a wholly integrated support shaft, wherein said shaft is an extension of said handle and is activated by pressing a button and forward twist of wrist, eliminating stress to the user of said wheeled valet.

* * * * *